(12) United States Patent
Zhang et al.

(10) Patent No.: US 11,531,246 B2
(45) Date of Patent: Dec. 20, 2022

(54) DISPLAY PANEL AND DRIVING METHOD THEREOF AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Le Zhang, Beijing (CN); Xuchen Yuan, Beijing (CN); Hong Liu, Beijing (CN); Bin Li, Beijing (CN); Pengcheng Tian, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 788 days.

(21) Appl. No.: 16/386,342

(22) Filed: Apr. 17, 2019

(65) Prior Publication Data
US 2020/0033688 A1 Jan. 30, 2020

(30) Foreign Application Priority Data
Jul. 25, 2018 (CN) .......................... 201810826506.6

(51) Int. Cl.
| G02F 1/167 | (2019.01) |
| G02F 1/1685 | (2019.01) |
| G02F 1/1676 | (2019.01) |
| G02F 1/1343 | (2006.01) |

(52) U.S. Cl.
CPC .......... *G02F 1/167* (2013.01); *G02F 1/13439* (2013.01); *G02F 1/1676* (2019.01); *G02F 1/1685* (2019.01); *G02F 2201/123* (2013.01)

(58) Field of Classification Search
CPC ...... G02F 1/167; G02F 1/1685; G02F 1/1676; G02F 1/13439; G02F 2201/123
USPC .......................................................... 359/296
See application file for complete search history.

(56) References Cited

U.S. PATENT DOCUMENTS

2012/0081777 A1* 4/2012 Heikenfeld .......... G02B 26/005
359/290

* cited by examiner

*Primary Examiner* — Marin Pichler
*Assistant Examiner* — Mitchell T Oestreich
(74) *Attorney, Agent, or Firm* — Leason Ellis LLP

(57) ABSTRACT

A display panel, a driving method thereof and a display device are provided. The display panel includes a plurality of pixel units each of which includes a transparent electrode; a pixel electrode opposite to the transparent electrode; an auxiliary electrode at a side of the transparent electrode facing the pixel electrode, a channel penetrating through the auxiliary electrode; an electrostrictive dielectric layer between the auxiliary electrode and the transparent electrode, an accommodation space being formed in the electrostrictive dielectric layer; and charged particles located between the transparent electrode and the pixel electrode. The through channel is configured to allow the charged particles to pass through the auxiliary electrode through the through channel, and the electrostrictive dielectric layer is configured to selectively confine the charged particles in the accommodation space according to an electric field applied thereto.

19 Claims, 5 Drawing Sheets

DISPLAY PANEL AND DRIVING METHOD THEREOF AND DISPLAY DEVICE

CROSS REFERENCE TO RELATED APPLICATIONS

This application claims the priority of Chinese patent application No. 201810826506.6 entitled "Display Panel and Driving Method Thereof and Display Device" filed to CNIPA on Jul. 25, 2018, the entire text of which is incorporated herein by reference.

TECHNICAL FIELD

Embodiments of the present disclosure relate to a display panel, a driving method thereof and a display device.

BACKGROUND

The electronic paper display device is a paper-like electronic display device that uses electronic ink to display images. Electronic ink is a liquid material includes a plurality of suspended microcapsules. Each microcapsule includes positive charge particles and negative charge particles. Positive charge particles and negative charge particles have different colors. The electronic paper display device is also provided with a pixel electrode and an opposite transparent electrode, positive charge particles and negative charge particles move in an electric field between the pixel electrode and the opposite transparent electrode and can be finally adsorbed on the corresponding electrode so as to control different colors to be displayed on different pixel units and to display images.

The electronic tag is an application form of the electronic paper display device. As electronic tags have the advantages of reusability and wide viewing angle, they gradually become popular products in the market.

SUMMARY

At least one embodiment of the present disclosure provides a display panel comprising a plurality of pixel units, each pixel unit comprising, a transparent electrode; a pixel electrode opposite to the transparent electrode; an auxiliary electrode at a side of the transparent electrode facing the pixel electrode, wherein a through channel is provided in the auxiliary electrode; an electrostrictive dielectric layer between the auxiliary electrode and the transparent electrode, wherein an accommodation space is provided in the electrostrictive dielectric layer; and charged particles between the transparent electrode and the pixel electrode; wherein the through channel is configured to allow the charged particles to pass through the auxiliary electrode through the through channel, and the electrostrictive dielectric layer is configured to selectively confine the charged particles in the accommodation space according to an electric field applied thereto.

For example, the electrostrictive dielectric layer is further configured to enable the accommodation space to be changed from a first size to a second size according to the electric field applied thereto, wherein the electrostrictive dielectric layer is capable of confining the charged particles in the accommodation space when the accommodation space has the first size; and the electrostrictive dielectric layer allows the charged particles to leave the accommodation space when the accommodation space has the second size.

For example, the electrostrictive dielectric layer is further configured to enable the accommodation space to be reversibly changed between the first size and the second size according to the electric field applied thereto.

For example, at least one of the electrostrictive dielectric layer and the auxiliary electrode has a porous mesh structure.

For example, the electrostrictive dielectric layer comprises at least one of a ceramic electrostrictive material and a polymer electrostrictive material.

For example, the electrostrictive dielectric layer has a thickness between about 800 nanometers and about 2 micrometers.

For example, a minimum inner diameter of the through channel is at least about twice of a maximum diameter of the charged particles.

For example, the auxiliary electrode comprises graphene material.

For example, the display panel further comprises a drive circuit electrically connected to the transparent electrode, the pixel electrode, and the auxiliary electrode of at least one of the pixel units, wherein the drive circuit is configured to provide a first voltage difference between the transparent electrode and the pixel electrode to form a first working electric field to drive the charged particles to move toward the transparent electrode, to provide a second voltage difference between the transparent electrode and the auxiliary electrode to form a first auxiliary electric field to drive the electrostrictive dielectric layer to stretch so that the charged particles enter the accommodation space of the electrostrictive dielectric layer, and to stop the providing of the second voltage difference between the transparent electrode and the auxiliary electrode after the charged particles enter the accommodation space of the electrostrictive dielectric layer, so that the electrostrictive dielectric layer contracts to confine the charged particles in the accommodation space of the electrostrictive dielectric layer.

For example, the driving circuit is further configured to provide a third voltage difference between the transparent electrode and the auxiliary electrode to form a second auxiliary electric field to drive the electrostrictive dielectric layer to stretch so that the charged particles are released from the accommodation space of the electrostrictive dielectric layer when the charged particles are confined in the electrostrictive dielectric layer; and to provide a fourth voltage difference between the transparent electrode and the pixel electrode to form a second working electric field to drive the charged particles to move toward the pixel electrode.

At least one embodiment of the present disclosure provides a display device comprising the display panel.

At least one embodiment of the present disclosure provides a driving method of the display panel, comprising, providing a first voltage difference between the transparent electrode and the pixel electrode to form a first working electric field to drive the charged particles to move toward the transparent electrode; providing a second voltage difference between the transparent electrode and the auxiliary electrode to form a first auxiliary electric field to drive the electrostrictive dielectric layer to stretch so that the charged particles enter the accommodation space of the electrostrictive dielectric layer; and after the charged particles enter the accommodation space of the electrostrictive dielectric layer, stopping providing the second voltage difference between the transparent electrode and the auxiliary electrode so that the electrostrictive dielectric layer contracts to confine the charged particles in the accommodation space of the electrostrictive dielectric layer.

For example, directions of the first working electric field and the first auxiliary electric field are the same.

For example, duration of the first working electric field and duration of the first auxiliary electric field do not overlap.

For example, the auxiliary electrode includes a first surface facing the pixel electrode; and after the charged particles move from a position far away from the auxiliary electrode to a position where at least a portion of the charged particles are located between the first surface of the auxiliary electrode and the transparent electrode under the drive of a first working electric field, stopthe providing of the first voltage difference between the transparent electrode and the pixel electrode, and perform the providing of the second voltage difference between the transparent electrode and the auxiliary electrode so that the charged particles enter the accommodation space in the electrostrictive dielectric layer.

For example, when the charged particles are confined in the electrostrictive dielectric layer, providing a third voltage difference between the transparent electrode and the auxiliary electrode to form a second auxiliary electric field to drive the electrostrictive dielectric layer to stretch so that the charged particles are released from the accommodation space of the electrostrictive dielectric layer; and providing a fourth voltage difference between the transparent electrode and the pixel electrode to form a second working electric field to drive the charged particles to move toward the pixel electrode.

For example, directions of the second working electric field and the second auxiliary electric field are substantially the same.

For example, duration of the second working electric field and duration of the second auxiliary electric field do not overlap.

For example, the auxiliary electrode includes a second surface facing the transparent electrode, after the charged particles move from positions of the electrostrictive dielectric layer to positions where at least a portion of the charged particles are located between the second surface of the auxiliary electrode and the pixel electrode under the drive of a second auxiliary electric field, stop the providing of the third voltage difference between the transparent electrode and the auxiliary electrode, and perform the providing of the fourth voltage difference between the transparent electrode and the pixel electrode.

BRIEF DESCRIPTION OF THE DRAWINGS

The embodiments of the present disclosure will be described in more detail below with reference to the accompanying drawings in order to enable those of ordinary skill in the art to more clearly understand the embodiments of the present disclosure, in which.

DETAILED DESCRIPTION

Hereinafter, technical solutions of the embodiments will be described in a clearly and fully understandable way in connection with the drawings related to the embodiments of the disclosure. It is apparent that the described embodiments are just a part but not all of the embodiments of the disclosure. Based on the described embodiments herein, a person of ordinary skill in the art can obtain other embodiment(s), without any creative work, which shall be fall within the scope of the disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may also include an electrical connection/coupling, directly or indirectly. The terms, "on," "under," "left," "right," or the like are only used to indicate relative position relationship, and when the position of the object which is described is changed, the relative position relationship may be changed accordingly.

In order to keep the following description of embodiments of the present disclosure clear and concise, detailed descriptions of known functions and known components are omitted from the present disclosure.

The display characteristics of electronic tags require that the electric field in them should remain stable for a long time. However, the electric field cannot be maintained stably for a long time due to the limitation of production process and equipment, which will lead to TFT leakage and other reasons. In addition, due to the gravity of the ink particles themselves, the display particles on the top of the paper film will gradually fall down over time. Therefore, charged particles cannot be stably held at the top of the electronic paper display panel, resulting in the visual color fading and the abnormal image display, and affecting the display quality.

The embodiments of the present disclosure provide a display panel, a driving method thereof and a display device, which can effectively prevent charged particles from disadvantageously falling from the top of an electronic paper display panel, and improving display quality.

Figure 1:
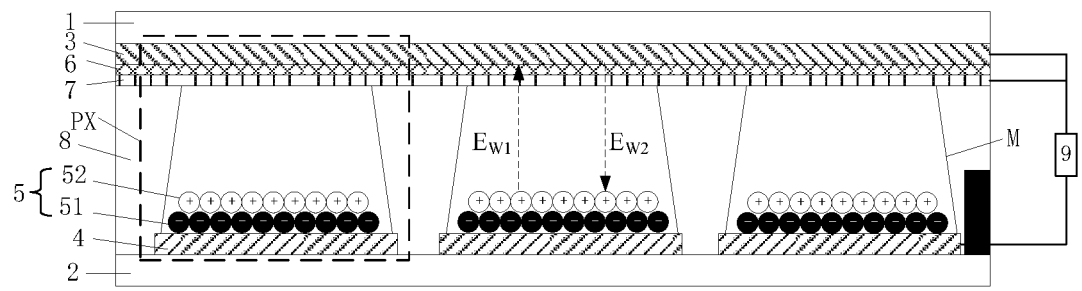
FIG. 1 is a structural diagram showing an electronic paper display panel provided in an embodiment of the present disclosure.

Referring to FIG. 1, a display panel 100 provided by an embodiment of the present disclosure is, for example, an electronic paper display panel, which includes a first substrate 1, a second substrate 2 disposed oppositely to the first substrate 1, and a plurality of pixel units PX (see a dashed box in FIG. 1) located between the first substrate 1 and the second substrate 2. Only three pixel units PX are schematically shown in FIG. 1.

Each pixel unit PX includes a transparent electrode 3 located on a first substrate 1, a pixel electrode 4 located on a second substrate 2, electrophoretic microcapsules M located between the first substrate 1 and the second substrate 2, and an electrostrictive dielectric layer 6 and an auxiliary electrode 7 located on the first substrate 1. For example, each electrophoretic microcapsule M is separated by a sealant 8.

For example, the first substrate 1 is transparent. For example, the first substrate 1 may be a PET (Polyethylene terephthalate) substrate, a glass substrate, or the like.

The transparent electrode 3 is provided on the side of the first substrate 1 facing the second substrate 2. For example, the transparent electrode 3 is configured as a common electrode connected to a reference potential. The reference potential may be 0V or other potential values. In this embodiment, the transparent electrodes 3 in various pixel units PX respectively are connected to each other to be a continuous transparent electrode layer 3. In another embodiment, the transparent electrodes 3 in the pixel units may be physically separated from each other.

A plurality of pixel electrodes 4 and a plurality of thin film transistors (not shown) are provided on a side of the second substrate 2 facing the first substrate 1. Each pixel electrode 4 is electrically connected to a drain of a thin film transistor. Each pixel electrode 4 and a corresponding transparent electrode 3 are disposed oppositely to each other. Each electrophoretic microcapsule M is disposed between a corresponding pixel electrode 4 and a corresponding transparent electrode 3. A positive voltage or a negative voltage may be applied to each pixel electrode 4 to form a working electric field $E_{W1}$ or $E_{W2}$ between the pixel electrode 4 and the transparent electrode 3 to drive charged particles 5 to move in the electrophoretic liquid of the electrophoretic microcapsule M.

For example, the charged particles 5 may include negatively charged black particles 51 and positively charged white particles 52. In another example, the charged particles 5 may include red charged particles, green charged particles, and blue charged particles, however, embodiments of the present disclosure are not limited thereto.

The auxiliary electrode 7 is in direct contact with the electrophoretic fluid of the electrophoretic microcapsule M. For example, the charged particles 5 including the negatively charged black particles 51 and the positively charged white particles 52 may move to the surface of the auxiliary electrode layer 7 facing the pixel electrode 4 under the driving of the working electric field.

For example, a plurality of channels are located in and pass through the auxiliary electrode 7. For example, the through channels 71 in the auxiliary electrode 7 are configured to allow the charged particles 5 to pass through the auxiliary electrodes 7.

Figure 2:
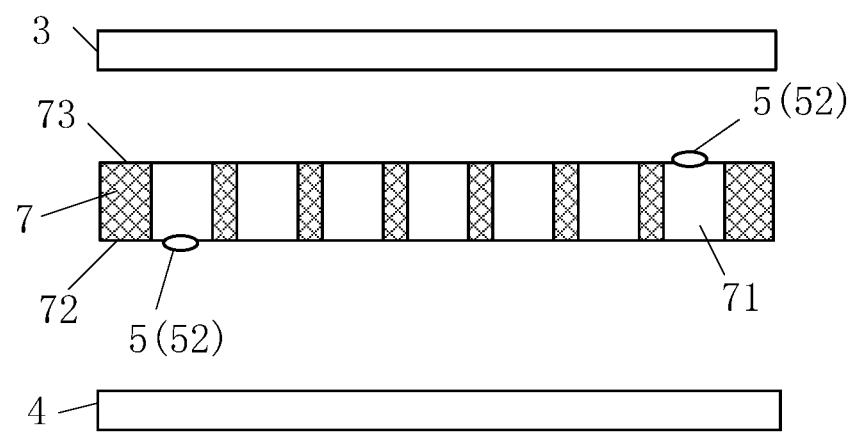
FIG. 2 is a schematic diagram showing through channels of an auxiliary electrode and positional relationships of charged particles with auxiliary electrodes, transparent electrodes, and pixel electrodes in an electronic paper display panel provided by an embodiment of the present disclosure.

For example, the through channels 71 in the auxiliary electrode 7 may be through holes, as shown in FIG. 2. For example, charged particles 5 including negatively charged black particles 51 and positively charged white particles 52 (only one charged particle is exemplified in FIG. 2) can freely enter and exit and pass through channels 71 in the auxiliary electrode 7. For example, the minimum inner diameter of the through channel 71 is at least twice of the maximum diameter of the charged particles 5. In an example, the minimum inner diameter of the through channel 71 is about 2 μm, while the outer diameter of the charged particles 5 is in the range of about 200 nm to about 500 nm.

In an example, the auxiliary electrode 7 includes a carbon material, for example, a graphene material.

In another example, the auxiliary electrode 7 may have a porous mesh structure, such as a mesh foam configuration. For example, the auxiliary electrode 7 may be reticulated foam metal.

The through channels 71 in the auxiliary electrode 7 may be regular in shapes or irregular, but the designs of the through channels 71 can communicate the opposite two sides of the auxiliary electrode 7 (i.e., the side facing the electrostrictive dielectric layer 6 and the side facing the pixel electrode 4) so that the charged particles 5 can pass therethrough to reach the surface of the electrostrictive dielectric layer 6.

The electrostrictive dielectric layer 6 is located between the auxiliary electrode 7 and the transparent electrode 3. The electrostrictive dielectric layer 6 is configured to selectively confine the charged particles 5 therein according to an electric field applied thereto. Here, the electric field applied to the electrostrictive dielectric layer 6 can be understood as the electric field in which the electrostrictive dielectric layer 6 is located. That is, when the electrostrictive dielectric layer 6 is in one electric field, the charged particles 5 cannot be confined therein, while when the electrostrictive dielectric layer 6 is in another electric field, the charged particles 5 can be confined therein.

Referring to FIG. 3A to FIG. 5, a plurality of accommodation spaces R are located in the electrostrictive dielectric layer 6. Here, the electrostrictive dielectric layer 6 is shown to include four cube accommodation spaces R communicating with each other. The electrostrictive dielectric layer has, for example, a porous mesh configuration, but embodiments of the present disclosure are not limited thereto. In other examples, the accommodation spaces R may be spherical, pyramidal, frustum-shaped, irregular, or the like, but embodiments of the present disclosure are not limited thereto.

For example, charged particles are illustratively shown here as positively charged white particles 52, but embodiments of the present disclosure are not limited thereto.

Figure 3A:
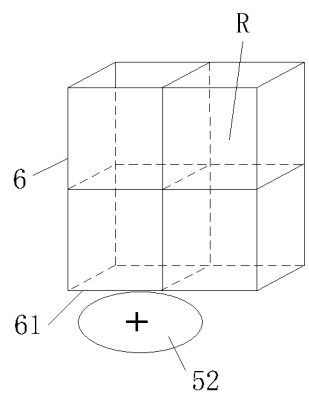
FIG. 3A is a schematic diagram showing the structure of the electrostrictive dielectric layer in the electronic paper display panel provided by the embodiment of the present disclosure when the electrostrictive dielectric layer is in an non-stretch state and the positional relationship between charged particles and the electrostrictive dielectric layer.

Referring to FIG. 3A, when no electric field is applied to the electrostrictive dielectric layer 6 or the electric field applied thereto is not sufficient to result in an electrostrictive effect, each accommodation space R in the electrostrictive dielectric layer 6 has a first size. For example, when the accommodation space R of the electrostrictive dielectric layer 6 has the first size, the electrostrictive dielectric layer 6 does not allow charged particles 52 to enter therein. For example, the maximum size of the opening in the lower surface 61 of the electrostrictive dielectric layer 6 having the accommodation spaces R of the first size is about 200 nm, and the outer diameter of the charged particles 52 is in a range of about 200 nm to about 500 nm. In this way, when the charged particles 52 move to the vicinity of the lower surface 61 of the electrostrictive dielectric layer 6 (for example, when the charged particles 52 move to the lower surface 61 of the electrostrictive dielectric layer 6), the charged particles 52 cannot enter the electrostrictive dielectric layer 6 because they cannot enter the accommodation space R having the first size. Here, the movement of the charged particles 52 near the lower surface 61 of the electrostrictive dielectric layer 6 may mean, for example, that the charged particles 52 move at least partially on the lower surface 72 of the auxiliary electrode 7, for example, while at least partially into the through channel 71 of the auxiliary electrode. In another example, for example, the maximum size of the opening in the lower surface 61 of the electrostrictive dielectric layer 6 having the accommodation spaces R of the first size is about 250 nm, and the outer diameter of the charged particles 52 is in the range of about 200 nm to about 500 nm. When the charged particles 52 move to the vicinity of the lower surface 61 of the electrostrictive dielectric layer 6 (e.g., when the charged particles 52 move to the lower surface 61 of the electrostrictive dielectric layer 6), part of the charged particles 52 may enter the accommodation space R having the first size, but at this time, the electrostrictive dielectric layer 6 cannot restrict the entered part of the charged particles 52 from escaping therefrom.

Figure 3B:
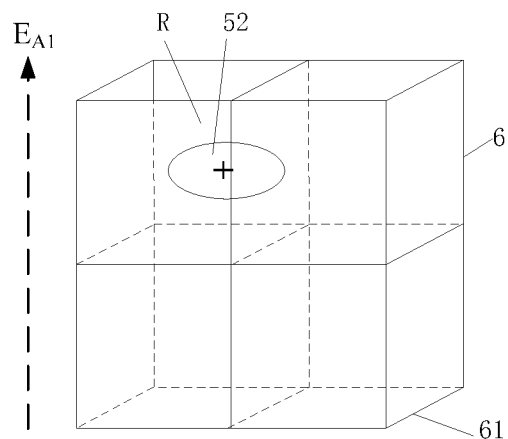
FIG. 3B is a schematic diagram showing the structure of the electrostrictive dielectric layer in the electronic paper display panel provided by the embodiment of the present disclosure when the electrostrictive dielectric layer is in an electro-stretch state and the positional relationship between charged particles and the electrostrictive dielectric layer.

Referring to FIG. 3B, when an upward first auxiliary electric field $E_{A1}$ is applied to the electrostrictive dielectric layer 6 (refer to the dashed arrow shown in the left portion of FIG. 3B), the electrostrictive dielectric layer 6 is extended such that each accommodation space R therein has a second size. The second dimension is larger than the first dimension. The maximum size of the opening in the lower surface 61 of the electrostrictive dielectric layer 6 having the accommodation spaces R of the second size is about 600 nm. In this way, the electrostrictive dielectric layer 6 having the accommodation spaces R of the second size, for example, allows the charged particles 52 to freely enter and exit. At this time, the charged particles 52 can move upward into the electrostrictive dielectric layer 6 under the action of the first auxiliary electric field $E_{A1}$.

Figure 3C:
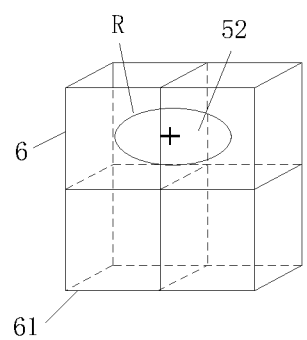
FIG. 3C is a schematic diagram showing the structure of the electrostrictive dielectric layer in the electronic paper display panel provided by the embodiment of the present disclosure when the electrostrictive dielectric layer is in an electro-shrink state and the positional relationship between charged particles and the electrostrictive dielectric layer.

Referring to FIG. 3C, after the charged particles 52 enter the accommodation space R in the electrostrictive dielectric layer 6, if the first auxiliary electric field $E_{A1}$ is removed, the electrostrictive dielectric layer 6 will shrink so that each of the accommodation spaces R therein has a third size, and the charged particles 52 cannot escape from the accommodation space R having the third size and are bound in the electrostrictive dielectric layer 6 to realize image display. Here, the third dimension of the accommodation space R may be the same as or different from the first dimension of the accommodation space R, for example. For example, the maximum size of the opening of the accommodation space R on the lower surface 61 of the electrostrictive dielectric layer 6 is restored to 200 nm again, for example, so that the charged particles 52 cannot pass through the opening and are bound in the electrostrictive dielectric layer 6. In this state, the electrostrictive dielectric layer 6 restricts the charged particles 52 therein. The charged particles 52 cannot escape from electrostrictive dielectric layer 6.

Figure 4:
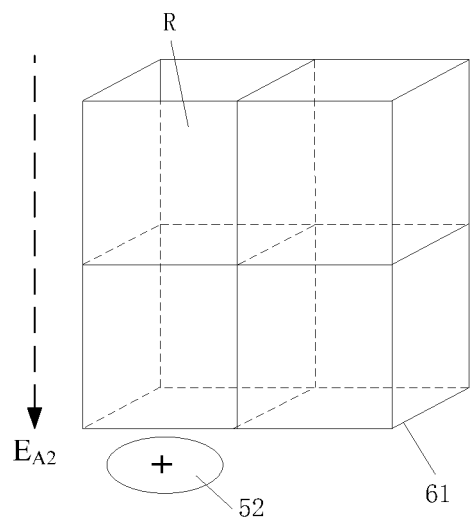
FIG. 4 is a schematic diagram showing the structure of the electrostrictive dielectric layer in the electronic paper display panel provided by the embodiment of the present disclosure when the electrostrictive dielectric layer is in another electro-stretch state and the positional relationship between charged particles and the electrostrictive dielectric layer.

Referring to FIG. 4 and FIG. 3C at the same time, with the charged particles 52 confined in the electrostrictive dielectric layer 6, a downward second auxiliary electric field $E_{A2}$ (see the dashed arrow shown in the left part of FIG. 4) is applied to the electrostrictive dielectric layer 6, and the electrostrictive dielectric layer 6 is stretched again so that each accommodation space R therein has a fourth size. Here, the fourth dimension of the accommodation space R may be the same as or different from the second dimension of the accommodation space R, for example. The electrostrictive dielectric layer 6 having the accommodation spaces R of the fourth size allows, for example, charged particles 52 to freely enter and exit. At this time, the charged particles 52 can move downward and leave the electrostrictive dielectric layer 6 under the action of the second auxiliary electric field $E_{A2}$.

It should be noted that the size of each accommodation space R in the stretched electrostrictive dielectric layer 6 is related to the size of the auxiliary electric field regardless of the direction of the auxiliary electric field applied thereto. For example, the larger the auxiliary electric field is, the larger the size of the accommodation space R in the stretched electrostrictive dielectric layer 6 is.

Figure 5:
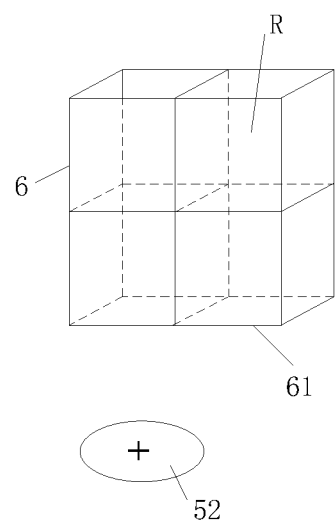
FIG. 5 is a schematic diagram showing the structure of the electrostrictive dielectric layer in the electronic paper display panel in another electro-shrink state and the positional relationship between the charged particles and the electrostrictive dielectric layer provided by the embodiment of the present disclosure.

After the charged particles 52 move downward under the action of the second auxiliary electric field $E_{A2}$ and leave the electrostrictive dielectric layer 6, if the second auxiliary electric field $E_{A2}$ is removed, the electrostrictive dielectric layer 6 will shrink so that the accommodation space R therein has a fifth size, as shown in FIG. 5. Here, the fifth dimension of the accommodation space R may be the same as or different from the first dimension and the third dimension of the accommodation space R, for example. At this time, since the charged particles 52 have previously escaped from the electrostrictive dielectric layer 6, the shrunk electrostrictive dielectric layer 6 does not substantially affect the movement of the charged particles 52.

Here, the first auxiliary electric field $E_{A1}$ and the second auxiliary electric field $E_{A2}$ are both applied to the electrostrictive dielectric layer 6 through the auxiliary electrode 7 and the transparent electrode 3. The first auxiliary electric field $E_{A1}$ and the second auxiliary electric field $E_{A2}$ are substantially equal in value but opposite in direction. Both the first auxiliary electric field $E_{A1}$ and the second auxiliary electric field $E_{A2}$ can result in the electrostrictive effect of the electrostrictive dielectric layer 6. For example, the first auxiliary electric field $E_{A1}$ and the second auxiliary electric field $E_{A2}$ are both greater than or equal to about $1\times10^6$ V/m.

In the embodiment of the present disclosure, the electrostrictive dielectric layer 6 includes at least one of a ceramic electrostrictive material and a polymer electrostrictive material. The ceramic electrostrictive material includes, for example, lead magnesium niobate $Pb(Mg_{1/3}Nb_{2/3})O_3$, lead titanate ($PbTiO_3$) and tungsten trioxide doped and modified lead magnesium niobate multioxide $(1-y)[(1-x)$ PMN-x $PbTiO_3]$-$yWO_3$, lead zinc niobate $Pb(Zn_{1/3}Nb_{2/3})O_3$, etc. Polymer electrostrictive materials include, for example, polyurethane elastomers.

For example, the thickness of the electrostrictive dielectric layer 6 is between about 800 nanometers and about 2 micrometers.

For example, the electrostrictive dielectric layer 6 is in direct contact with the auxiliary electrode layer 7 below it. However, embodiments of the present disclosure are not limited thereto. In another example, the electrostrictive dielectric layer 6 and the auxiliary electrode layer 7 may not be in direct contact, and another porous dielectric material layer may be provided therebetween, for example. By design, charged particles can pass through the auxiliary electrode layer 7 and the other porous material layer to reach the vicinity of the lower surface 61 of the electrostrictive dielectric layer 6. Here, the charged particles 52 move to the vicinity of the lower surface 61 of the electrostrictive dielectric layer 6 may mean, for example, the charged particles 52 may move to positions between the lower surface 61 of the electrostrictive dielectric layer 6 and the upper surface 73 of the auxiliary electrode 7. Here, the lower surface 61 of the electrostrictive dielectric layer 6 is the surface of the electrostrictive dielectric layer 6 facing the pixel electrode 4; the upper surface 73 of the auxiliary electrode 7 is the surface of the auxiliary electrode 7 facing the transparent electrode 3.

In this embodiment, the electrostrictive dielectric layers 6 in each pixel unit PX are connected to each other to be a continuous electrostrictive dielectric layer 6. In another embodiment, the electrostrictive dielectric layers 6 in the pixel units may be physically separated from each other. In this embodiment, the auxiliary electrodes 7 in each pixel unit PX are connected to each other to be a continuous auxiliary electrode layer 7. In another embodiment, the auxiliary electrodes 7 in the pixel units may be physically separated from each other.

In the embodiments of the present disclosure, the charged particles can be selectively bound by the electrostrictive dielectric layer. In this way, the charged particles bound in the electrostrictive dielectric layer cannot fall off from it, which can prevent the deterioration of the display effect due to the charged particles falling off after the electric field cannot be maintained for a long time.

In the embodiment of the present disclosure, for example, the first dimension, the third dimension and the fifth dimension of the accommodation spaces R in the electrostrictive dielectric layer 6 are substantially the same, and the second dimension and the fourth dimension of the accommodation spaces R are substantially the same. That is, the size of each of the accommodation spaces R in the electrostrictive dielectric layer 6 can be reversibly changed between the first size and the second size.

In the above embodiment, the charged particles can enter the electrostrictive dielectric layer and can also escape from the electrostrictive dielectric layer. However, embodiments of the present disclosure are not limited thereto. For example, in some cases, the charged particles can only enter the electrostrictive dielectric layer and cannot escape from the electrostrictive dielectric layer. In this case, the charged particles bound in the electrostrictive dielectric layer will not fall off therefrom, and it can also avoid the deterioration of the display effect due to the falling of the charged particles after the electric field cannot be maintained for a long time.

The electronic paper display panel provided in an embodiment of the present disclosure may further include a driving circuit 9 electrically connected to the transparent electrode 3, the pixel electrode 4, and the auxiliary electrode 7 of the at least one pixel unit PX, and configured to perform steps 100 to 300 in the driving method described below. Further, for example, the driving circuit 9 is configured to perform steps 400 to 500 in the driving method described below.

For example, the drive circuit 9 may be implemented in software so as to be executed by various types of processors. For example, the drive circuit 9 may be a module implemented in software under the consideration of the level of existing hardware processes. Those skilled in the art can build corresponding hardware circuits to realize corresponding functions. The hardware circuits may include conventional very large scale integration (VLSI) circuits or gate arrays and existing semiconductors, such as logic chips, transistors, or other discrete components. For example, the drive circuit 9 may also be implemented with programmable hardware devices, such as field programmable gate arrays, programmable array logics, programmable logic devices, etc.

Figure 6:
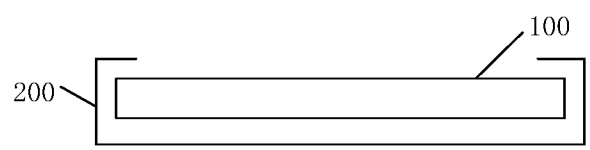
FIG. 6 is a schematic diagram showing an electronic paper display device provided in an embodiment of the present disclosure.

The embodiments of the present disclosure also provide a display device, as shown in FIG. 6, including any of the above display panels 100. The display device further includes, for example, a housing 200 that houses the display panel. The display device provided by the embodiment of the present disclosure is, for example, an electronic paper display device.

Figure 7:
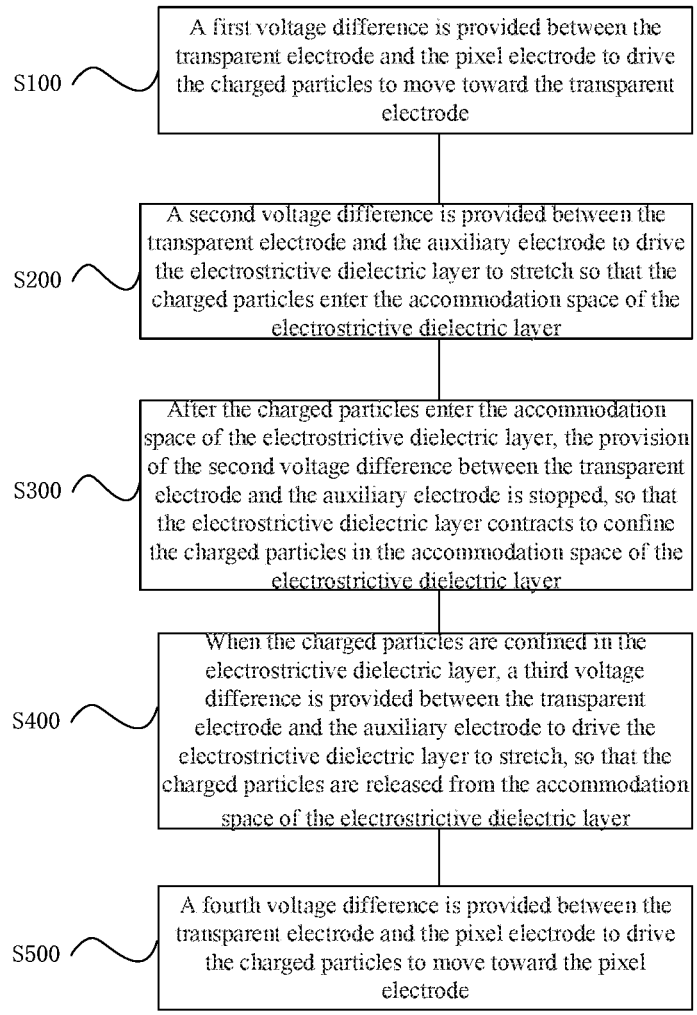
FIG. 7 is a flowchart showing a driving method of an electronic paper display panel provided by an embodiment of the present disclosure.

The embodiments of the present disclosure also provide a driving method for any of the above electronic paper display panels, referring to FIG. 7, the method includes the following steps S100 to S300:

Step S100: A voltage difference is provided between the transparent electrode and the pixel electrode to drive the charged particles to move toward the transparent electrode.

For example, a first voltage difference V1 is provided between the transparent electrode 3 and the pixel electrode 4 to form a first working electric field $E_{W1}$ (as indicated by an upward dashed arrow in FIG. 1) to drive the positively charged white particles 52 to move upward toward the transparent electrode 3; under the drive of the first working electric field $E_{W1}$, the negatively charged black particles 51 move downward toward the pixel electrode 4.

For example, the transparent electrode 3 is grounded such that the voltage thereon is 0V, and a voltage of about 15V is applied to the pixel electrode 4, so that the first voltage difference V1 between the pixel electrode 4 and the transparent electrode 3 is about 15V. The first voltage difference V1 forms a first working electric field $E_{W1}$ between the transparent electrode 3 and the pixel electrode 4. For example, positively charged white particles 52 move to the vicinity of the lower surface of the auxiliary electrode 7 under the drive of the first working electric field $E_{W1}$, and further pass through channels 71 in the auxiliary electrode 7 to reach the vicinity of the lower surface of the electrostrictive dielectric layer 6 under the drive of the first working electric field $E_{W1}$, for example, see FIG. 3A. Here, the movement of the positively charged white particles 52 to the vicinity of the lower surface of the electrostrictive dielectric layer 6 may mean, for example, that the positively charged white particles 52 move at least partially above the lower surface 72 of the auxiliary electrode 7, for example, while at least partially into the through channel 71 of the auxiliary electrode.

For example, driven by the first working electric field $E_{W1}$, the negatively charged black particles 51 move downward to the vicinity of the upper surface of the pixel electrode 4, for example, in contact with the upper surface of the pixel electrode 4.

Step S200: Another voltage difference is provided between the transparent electrode and the auxiliary electrode to drive the electrostrictive dielectric layer to stretch so that the charged particles enter the accommodation space of the electrostrictive dielectric layer.

For example, referring to FIG. 3B, a second voltage difference is provided between the transparent electrode 3 and the auxiliary electrode 7 to form a first auxiliary electric field $E_{A1}$ (shown by an upward dashed arrow in FIG. 3B) to drive the electrostrictive dielectric layer 6 to stretch so that positively charged white particles 52 enter the accommodation space R of the electrostrictive dielectric layer 6.

For example, the transparent electrode 3 is kept grounded so that the voltage thereon is 0V, and a voltage of about 1V is applied to the auxiliary electrode 7, so that the second voltage difference V2 between the auxiliary electrode 4 and the transparent electrode 3 is about 1V. Here, for example, the thickness of the electrostrictive dielectric layer 6 is about 1 micron, and the electrostrictive dielectric layer 6 is in direct contact with the transparent electrode 3 and the auxiliary electrode 7. In this way, the second voltage difference V2 forms a first auxiliary electric field $E_{A1}$ of about $1\times10^6$ V/m between the transparent electrode 3 and the auxiliary electrode 7. The electrostrictive dielectric layer 6 is located in the first auxiliary electric field $E_{A1}$ and extends under the action of the first auxiliary electric field $E_{A1}$, so that positively charged white particles 52 enter the accommodation space R of the electrostrictive dielectric layer 6. Here, the directions of the first operating electric field $E_{W1}$ and the first auxiliary electric field $E_{A1}$ are substantially the same.

Step S300: After charged particles enter the accommodation space of the electrostrictive dielectric layer, stop providing the another voltage difference between the transparent electrode and the auxiliary electrode, so that the electrostrictive dielectric layer contracts to confine the charged particles in the accommodation space of the electrostrictive dielectric layer.

Referring to FIG. 3C, after the positively charged white particles 52 enter the accommodation space R of the electrostrictive dielectric layer 6, the provision of the second voltage difference V2 between the transparent electrode 3 and the auxiliary electrode 7 is stopped so that the electrostrictive dielectric layer 6 contracts to confine the positively charged white particles 52 in the accommodation space R of the electrostrictive dielectric layer 6.

For example, after the positively charged white particles 52 enter the accommodation space R of the electrostrictive dielectric layer 6, a voltage of about 1V applied to the auxiliary electrode 7 is removed, so that the first auxiliary electric field $E_{A1}$ between the transparent electrode 3 and the auxiliary electrode 7 disappears. In this way, the electrostrictive dielectric layer 6 contracts to confine the positively charged white particles 52 in the accommodation space R of the electrostrictive dielectric layer 6.

In this way, since the positively charged white particles 52 are bound in the electrostrictive dielectric layer 6 and cannot fall off after power is off, the risk that the charged particles fall off as not being used for a long time is avoided.

For example, when the positively charged white particles 52 are bound in the electrostrictive dielectric layer 6, the negatively charged black particles 51 are held near the upper surface of the pixel electrode 4. For example, at this time, a voltage of about 15V can be kept applied to the pixel electrode 4, and the negatively charged black particles 51 are adsorbed on the upper surface of the pixel electrode 4; or, at this time, the voltage of about 15V on the pixel electrode 4 is removed, and the negatively charged black particles 51 remain on the upper surface of the pixel electrode 4 due to inertia, gravity, or other reasons.

Figure 8:
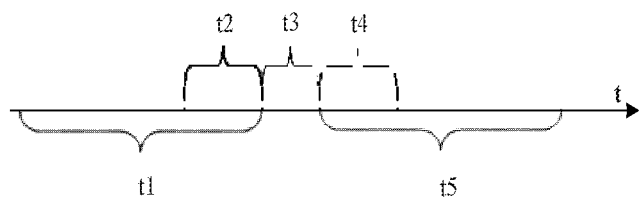
FIG. 8 shows a driving timing diagram in which the duration of the first working electric field and the duration of the first auxiliary electric field overlap and the duration of the second working electric field and the duration of the second auxiliary electric field overlap according to an embodiment of the present disclosure.

In an example, the duration t1 of the first working electric field $E_{W1}$ and the duration t2 of the first auxiliary electric field $E_{A1}$ may overlap. For example, referring to FIG. 8, the duration t1 of the first working electric field $E_{W1}$ is from the 1st millisecond to the 10th millisecond, and the duration t2 of the first auxiliary electric field $E_{A1}$ is from the 8th millisecond to the 10th millisecond. In FIG. 8, in the t3 period, for example, from the 10th millisecond to the 20th millisecond, the positively charged white particles 52 are bound in the electrostrictive dielectric layer 6 for this duration after the first working electric field $E_{W1}$ and the first auxiliary electric field $E_{A1}$ are both removed. In the above embodiment, for example, the transparent electrode 3 is grounded such that the voltage thereon is 0V, simultaneously a voltage of about 15V is applied to the pixel electrode 4, and a voltage of about 1V is applied to the auxiliary electrode 7. In this way, the application of the first auxiliary electric field $E_{A1}$ does not need to consider the presence or absence of the first working electric field $E_{W1}$, so that the electric signal normally supplied to the pixel electrode 4 does not need to be changed, avoiding the complexity of the application of the electric signal.

Figure 9:
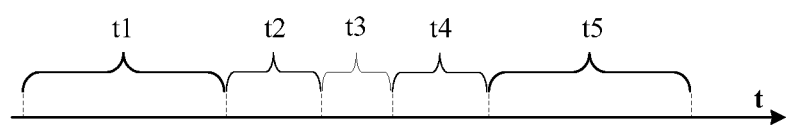
FIG. 9 shows a driving timing diagram in which the duration of the first working electric field and the duration of the first auxiliary electric field do not overlap and the duration of the second working electric field and the duration of the second auxiliary electric field do not overlap according to an embodiment of the present disclosure.

In another example, the duration t1 of the first working electric field $E_{W1}$ and the duration t2 of the first auxiliary electric field $E_{A1}$ do not overlap. For example, referring to FIG. 9, the duration t1 of the first working electric field $E_{W1}$ is from the 1st millisecond to the 10th millisecond, and the duration t2 of the first auxiliary electric field $E_{A1}$ is from the 10th millisecond to the 12th millisecond. In FIG. 9, in the t3 period, for example, from the 12th millisecond to the 22nd millisecond, the positively charged white particles 52 are bound in the electrostrictive dielectric layer 6 for this duration after the first working electric field $E_{W1}$ and the first auxiliary electric field $E_{A1}$ are both removed. For example, in the above embodiment, applying a voltage of about 15V to the pixel electrode 4 and applying a voltage of about 1V to the auxiliary electrode 7 are not performed simultaneously. That is, when the positively charged white particles 52 move to the lower surface of the electrostrictive dielectric layer 6, the voltage of about 15V applied to the pixel electrode 4 is first removed, and then the voltage of about 1V is applied to the auxiliary electrode 7. In this way, it is possible to prevent the simultaneous application of voltages on the pixel electrode 4 and the auxiliary electrode 7 from adversely affecting the movement of charged particles near the auxiliary electrode 7, to allow the charged particles to smoothly enter the accommodation space R in the electrostrictive dielectric layer 6.

Figure 10:
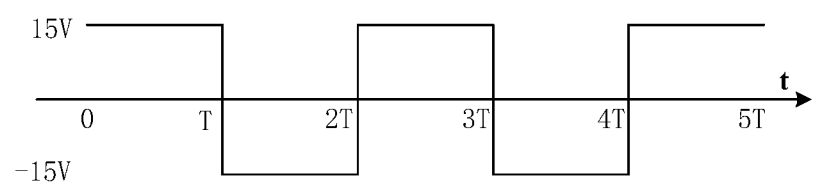
FIG. 10 shows an original square wave signal applied to the pixel electrode for displaying an image regardless of the auxiliary electrode and the electrostrictive dielectric layer 6 in the display panel shown in FIG. 1.

For example, the duration t1 of the first working electric field $E_{W1}$ is about 10 ms, which can sufficiently allow substantially all positively charged white particles 52 to move to the vicinity of the lower surface of the electrostrictive dielectric layer 6. At this time, the application of the voltage of about 15V to the pixel electrode 4 can be stopped and the application of the voltage of about 1V to the auxiliary electrode 7 can be started. It is understood that t1 is about 10 ms only as an example. FIG. 10 shows an original square wave signal applied to the pixel electrode 4 for displaying an image regardless of the auxiliary electrode 7 and the electrostrictive dielectric layer 6. The period and amplitude of this original square wave signal can be referred to conventional techniques. To enable the positively charged white particles 52 to have moved to the vicinity of the lower surface of the electrostrictive dielectric layer 6 at the time when the application of the voltage of 15V to the pixel electrode 4 is stopped, t1 is, for example, greater than or equal to half (T) of the period (2T) of the square wave drive signal supplied to the pixel electrode 4, see FIG. 10. Similarly, t2 of about 2 ms is only an example, and embodiments of the present disclosure are not limited thereto. For example, one of ordinary skill in the art can determine the minimum value of t2 by testing the display effect so that positively charged white particles 52 sufficiently enter the electrostrictive dielectric layer 6.

For example, after the charged particles move from positions away from the auxiliary electrode 7 (see the positions of the positively charged white particles 52 in FIG. 1) to positions where at least a portion of the charged particles are located between the lower surface 72 of the auxiliary electrode 7 and the transparent electrode 3 (see the positional relationship between the positively charged white particles 52 on the left side and the auxiliary electrode 7 in FIG. 1 and FIG. 2) under the drive of the first working electric field $E_{W1}$, the provision of the first voltage difference V1 between the transparent electrode 3 and the pixel electrode 4 is stopped (i.e., the application of the voltage of about 15V to the pixel electrode 4 is stopped), and then the provision of the second voltage difference V2 between the transparent electrode 3 and the auxiliary electrode 7 is performed such that the positively charged white particles 52 enter the accommodation space R in the electrostrictive dielectric layer 6. Here, the lower surface 72 of the auxiliary electrode 7 is the surface of the auxiliary electrode 7 facing the pixel electrode 4.

The driving method provided by the embodiment of the present disclosure further includes steps S400 and S500.

Step S400: When the charged particles are confined in the electrostrictive dielectric layer, another voltage difference is provided between the transparent electrode and the auxiliary electrode to drive the electrostrictive dielectric layer to stretch so that the charged particles escape from the accommodation space of the electrostrictive dielectric layer.

For example, when the positively charged white particles 52 are confined in the electrostrictive dielectric layer 6, a third voltage difference V3 is provided between the transparent electrode 3 and the auxiliary electrode 7 to form a second auxiliary electric field $E_{A2}$ (as shown by the downward dashed arrow in FIG. 4) to drive the electrostrictive dielectric layer 6 to stretch, so that the positively charged white particles 52 are released from the accommodation space R of the electrostrictive dielectric layer 6.

It is understood that when the third voltage difference V3 is provided between the transparent electrode 3 and the auxiliary electrode 7 to form the second auxiliary electric field $E_{A2}$, the negatively charged black particles 51 can remain on the upper surface of the pixel electrode 4 according to the voltage applied to the pixel electrode 4 (for example, in the case where a positive voltage is applied to the pixel electrode 4 or the voltage is zero), or may be driven to move upward away from the pixel electrode 4 (for example, in the case where a negative voltage is applied to the pixel electrode 4).

For example, the transparent electrode 3 is kept grounded so that the voltage thereon is 0V, and a voltage of about −1V is applied to the auxiliary electrode 7, so that the third voltage difference V2 between the auxiliary electrode 4 and the transparent electrode 3 is about −1V. In this case, the second auxiliary electric field $E_{A2}$ formed between the transparent electrode 3 and the auxiliary electrode 7 by the second voltage difference V2 is about $-1 \times 10^6$ V/m. The electrostrictive dielectric layer 6 is located in the second auxiliary electric field $E_{A2}$ and extends under the action of the second auxiliary electric field $E_{A2}$, so that positively charged white particles 52 escape from the accommodation space R of the electrostrictive dielectric layer 6. It can be understood that due to the large absolute value of the second auxiliary electric field $E_{W2}$, positively charged white particles 52 may directly pass through the through channel 71 in the auxiliary electrode 7 and leave the auxiliary electrode 7 under the action of the second auxiliary electric field $E_{W2}$.

Step S500: Yet another voltage difference is provided between the transparent electrode and the pixel electrode to drive the charged particles to move toward the pixel electrode.

For example, a fourth voltage difference V4 is provided between the transparent electrode 3 and the pixel electrode 4 to form a second working electric field $E_{W2}$ (as indicated by a downward dashed arrow in FIG. 1) to drive the positively charged white particles 52 to move toward the pixel electrode 4. In this case, driven by the second working electric field $E_{W2}$, the negatively charged black particles 51 move upward toward the auxiliary electrode 7 to positions not in contact with the auxiliary electrode 7 to which a voltage of about −1V is applied.

It is noted that for the purpose of convenient description, the working electric fields $E_{W1}$ and $E_{W2}$ are both shown in FIG. 1, however, these two electric fields with opposite directions do not appear at the same time.

For example, the transparent electrode 3 is kept grounded so that the voltage thereon is 0V, and a voltage of about −15V is applied to the pixel electrode 4, so that the fourth voltage difference V4 of the pixel electrode 4 to the transparent electrode 3 is about −15V. The fourth voltage difference V4 forms a second working electric field $E_{W2}$ between the transparent electrode 3 and the pixel electrode 4. The second working electric field $E_{W2}$ drives the positively charged white particles 52 to move toward the pixel electrode 4. Here, the directions of the second working electric field $E_{W2}$ and the second auxiliary electric field $E_{W2}$ are substantially the same.

In an example, the duration t5 of the second working electric field $E_{W2}$ and the duration t4 of the second auxiliary electric field $E_{A2}$ may overlap. Referring to FIG. 8, the duration t4 of the second auxiliary electric field $E_{A2}$ is from 22nd to 24th milliseconds, and the duration t5 of the second working electric field $E_{W2}$ is from 22nd to 32nd milliseconds. For example, in the above embodiment, the transparent electrode 3 is grounded such that the voltage thereon is 0V, the auxiliary electrode 7 is applied with a voltage of about −1V, and the pixel electrode 4 is applied with a voltage of about −15V, which can be performed simultaneously. In this way, the application of the second auxiliary electric field $E_{A2}$ does not need to consider the presence or absence of the second working electric field $E_{W2}$, so that the electrical signal normally supplied to the pixel electrode 4 does not need to be changed, avoiding the complexity of the application of the electrical signal.

In another example, the duration t5 of the second working electric field $E_{W2}$ and the duration t4 of the second auxiliary electric field $E_{A2}$ do not overlap. For example, referring to FIG. 9, the duration t4 of the second auxiliary electric field $E_{A2}$ is from 22nd to 24th milliseconds, and the duration t5 of the second working electric field $E_{W2}$ is from 24th to 34th milliseconds. For example, in the above embodiment, applying a voltage of about −15V to the pixel electrode 4 and applying a voltage of about −1V to the auxiliary electrode 7 are not performed simultaneously. That is, when the positively charged white particles 52 move from positions in the electrostrictive dielectric layer 6 to the vicinity of the upper surface 73 of the auxiliary electrode 7, the voltage of about −1V applied to the auxiliary electrode is first removed, and then a voltage of about −15V is applied to the pixel electrode.

For example, a duration t4 of the second auxiliary electric field $E_{A1}$ of about 2 ms may allow substantially all of the positively charged white particles 52 to move to the vicinity of the lower surface of the auxiliary electrode 7, at which time the application of the voltage of about −1V to the auxiliary electrode 7 may be stopped and the application of a voltage of about −15V to the pixel electrode 4 may be started. It can be understood that t4 here is about 2 ms for example only. One of ordinary skill in the art can determine the minimum value of t4 by testing the display effect to allow the positively charged white particles 52 to be sufficiently separated from the electrostrictive dielectric layer 6. In another example, t4 is greater than t2, for example. In order to enable the positively charged white particles 52 to move to the vicinity of the upper surface of the pixel electrode 4 and the negatively charged black particles 51 to move to the vicinity of the lower surface of the electrostrictive dielectric layer 6 after the application of the voltage of about −1V to the auxiliary electrode 7 is stopped, t5 is, for example, greater than or equal to half (T) of the period (2T) of the original square wave drive signal supplied to the pixel electrode 4, see FIG. 10.

In this way, it is possible to prevent the simultaneous applications of voltages on the pixel electrode 4 and the auxiliary electrode 7 from adversely affecting the movement of charged particles near the auxiliary electrode 7, to allow the positively charged white particles 52 to smoothly leave the electrostrictive dielectric layer 6 and the auxiliary electrode 7 and allow the negatively charged black particles 51 to smoothly approach or enter the electrostrictive dielectric layer 6 and the auxiliary electrode 7.

For example, after the positively charged white particles 52 move from the positions in the electrostrictive dielectric layer 6 to the vicinity of the upper surface 73 of the auxiliary electrode 7 under the drive of the second working electric field $E_{W2}$, the supply of the third voltage difference V3 between the transparent electrode 3 and the auxiliary electrode 4 is stopped, and then the supply of the fourth voltage difference V4 between the transparent electrode 3 and the pixel electrode 4 is performed. Here, the movement of the positively charged white particles 52 to the vicinity of the upper surface 73 of the auxiliary electrode 7 may mean, for example, that the positively charged white particles 52 move at least partially below the upper surface 73 of the auxiliary electrode 7, for example, while at least partially into the through channel 71 of the auxiliary electrode. For example, under the drive of the second working electric field $E_{W2}$, at least a part of a positively charged white particle 52 is located at a position between the upper surface 73 of the auxiliary electrode 7 and the pixel electrode 4 (see, for example, the positional relationship between the positively charged white particle 52 and the auxiliary electrode 7 shown on the right side of FIG. 2). For example, driven by the second working electric field $E_{W2}$, the positively charged white particles 52 move downward to the vicinity of the upper surface of the pixel electrode 4, for example, in contact with the upper surface of the pixel electrode 4. For example, under the drive of the second working electric field $E_{W2}$, the negatively charged black particles 51 move upward to the vicinity of the lower surface of the auxiliary electrode 7, and further pass through the through channels 71 in the auxiliary electrode 7 to reach the vicinity of the lower surface of the electrostrictive dielectric layer 6 under the drive of the second working electric field $E_{W2}$. Here, the movement of the negatively charged black particles 51 to the vicinity of the lower surface of the electrostrictive dielectric layer 6 may mean, for example, that the negatively charged black particles 51 move at least partially above the lower surface 72 of the auxiliary electrode 7, for example, while at least partially into the through channel 71 of the auxiliary electrode.

After the negatively charged black particles 51 move to the vicinity of the lower surface of the electrostrictive dielectric layer 6, referring to the above description of steps S200 and S300, a fifth voltage difference may be provided between the transparent electrode 3 and the auxiliary electrode 7 to form a third auxiliary electric field $E_{A3}$ to drive the electrostrictive dielectric layer 6 to stretch so that the negatively charged black particles 51 enter the accommodation space R of the electrostrictive dielectric layer 6. After the negatively charged black particles 51 enter the accommodation space R of the electrostrictive dielectric layer 6, the supply of the fifth voltage difference between the transparent electrode 3 and the auxiliary electrode 7 is stopped so that the electrostrictive dielectric layer 6 contracts to confine the negatively charged black particles 51 in the accommodation space R of the electrostrictive dielectric layer 6.

Similar to the relationship between the first auxiliary electric field $E_{A1}$ and the second working electric field $E_{W2}$, the directions of the third auxiliary electric field $E_{A3}$ and the second working electric field $E_{W2}$ may be substantially the same, and the durations of the third auxiliary electric field $E_{A3}$ and the second working electric field $E_{W2}$ may overlap or not overlap.

After the negatively charged black particles 51 are confined in the accommodation space R of the electrostrictive dielectric layer 6, the step of driving the negatively charged black particles 51 out of the electrostrictive dielectric layer 6 can be referred to the above description of similar steps S400 and S500, and will not be repeated here.

Above, it has been exemplarily described that the positively charged white particles 52 and the negatively charged black particles 51 in one pixel unit display total white or total black, for example, within a given period of time, with the assistance of the electrostrictive dielectric layer 6. One of ordinary skill in the art can understand that in the same period of time, black and white display patterns can be formed by displaying different black and white pixels of a plurality of pixel units. Similarly, for a color display panel, in the same period of time, each pixel unit displays, for example, one color pixel, and different color pixels displayed by a plurality of pixel units can constitute a color display pattern.

The foregoing embodiments are only exemplary embodiments of the present disclosure; however, the present disclosure is not limited thereto. A person of ordinary skill in the art can make various changes and modifications without departing from the scope of the present disclosure, and such changes and modifications also fall into the scope of the present disclosure.

What is claimed is:

1. A display panel comprising a plurality of pixel units, each pixel unit comprising,
a transparent electrode;
a pixel electrode opposite to the transparent electrode;
an auxiliary electrode at a side of the transparent electrode facing the pixel electrode, wherein a through channel is provided in the auxiliary electrode;
an electrostrictive dielectric layer between the auxiliary electrode and the transparent electrode, wherein an accommodation space is provided in the electrostrictive dielectric layer; and
charged particles between the transparent electrode and the pixel electrode;
wherein the through channel is configured to allow the charged particles to pass through the auxiliary electrode through the through channel, and
the electrostrictive dielectric layer is configured to selectively confine the charged particles in the accommodation space according to an electric field applied thereto,
wherein the electrostrictive dielectric layer is further configured to enable the accommodation space to be changed from a first size to a second size according to the electric field applied thereto, wherein the electrostrictive dielectric layer is capable of confining the charged particles in the accommodation space when the accommodation space has the first size; and the electrostrictive dielectric layer allows the charged particles to leave the accommodation space when the accommodation space has the second size.

2. The display panel according to claim 1, wherein the electrostrictive dielectric layer is further configured to enable the accommodation space to be reversibly changed between the first size and the second size according to the electric field applied thereto.

3. The display panel according to claim 1, wherein at least one of the electrostrictive dielectric layer and the auxiliary electrode has a porous mesh structure.

4. The display device according to claim 1, wherein the electrostrictive dielectric layer comprises at least one of a ceramic electrostrictive material and a polymer electrostrictive material.

5. The display panel according to claim 1, wherein the electrostrictive dielectric layer has a thickness between 800 nanometers and 2 micrometers.

6. The display panel according to claim 1, wherein a minimum inner diameter of the through channel is at least twice of a maximum diameter of the charged particles.

7. The display panel according to claim 1, wherein the auxiliary electrode comprises graphene material.

8. The display panel according to claim 1, further comprising,
a drive circuit electrically connected to the transparent electrode, the pixel electrode, and the auxiliary electrode of at least one of the pixel units, wherein the drive circuit is configured to provide a first voltage difference between the transparent electrode and the pixel electrode to form a first working electric field to drive the charged particles to move toward the transparent electrode, to provide a second voltage difference between the transparent electrode and the auxiliary electrode to form a first auxiliary electric field to drive the electrostrictive dielectric layer to stretch so that the charged particles enter the accommodation space of the electrostrictive dielectric layer, and to stop the providing of the second voltage difference between the transparent electrode and the auxiliary electrode after the charged particles enter the accommodation space of the electrostrictive dielectric layer, so that the electrostrictive dielectric layer contracts to confine the charged particles in the accommodation space of the electrostrictive dielectric layer.

9. The display panel according to claim 8, wherein the driving circuit is further configured to provide a third voltage difference between the transparent electrode and the auxiliary electrode to form a second auxiliary electric field to drive the electrostrictive dielectric layer to stretch so that the charged particles are released from the accommodation space of the electrostrictive dielectric layer when the charged particles are confined in the electrostrictive dielectric layer; and to provide a fourth voltage difference between the transparent electrode and the pixel electrode to form a second working electric field to drive the charged particles to move toward the pixel electrode.

10. A display device comprising a display panel, wherein the display panel comprises:
a plurality of pixel units, each pixel unit comprising,
a transparent electrode;
a pixel electrode opposite to the transparent electrode;
an auxiliary electrode at a side of the transparent electrode facing the pixel electrode, wherein a through channel is provided in the auxiliary electrode;
an electrostrictive dielectric layer between the auxiliary electrode and the transparent electrode, wherein an accommodation space is provided in the electrostrictive dielectric layer; and
charged particles between the transparent electrode and the pixel electrode;
wherein the through channel is configured to allow the charged particles to pass through the auxiliary electrode through the through channel, and
the electrostrictive dielectric layer is configured to selectively confine the charged particles in the accommodation space according to an electric field applied thereto,
wherein the electrostrictive dielectric layer is further configured to enable the accommodation space to be changed from a first size to a second size according to the electric field applied thereto, wherein the electrostrictive dielectric layer is capable of confining the charged particles in the accommodation space when the accommodation space has the first size; and the electrostrictive dielectric layer allows the charged particles to leave the accommodation space when the accommodation space has the second size.

11. A driving method of a display panel according to claim 1, comprising,
providing a first voltage difference between the transparent electrode and the pixel electrode to form a first working electric field to drive the charged particles to move toward the transparent electrode;
providing a second voltage difference between the transparent electrode and the auxiliary electrode to form a first auxiliary electric field to drive the electrostrictive dielectric layer to stretch so that the charged particles enter the accommodation space of the electrostrictive dielectric layer; and
after the charged particles enter the accommodation space of the electrostrictive dielectric layer, stopping providing the second voltage difference between the transparent electrode and the auxiliary electrode so that the electrostrictive dielectric layer contracts to confine the charged particles in the accommodation space of the electrostrictive dielectric layer.

12. The driving method of the display panel according to claim 11, wherein directions of the first working electric field and the first auxiliary electric field are the same.

13. The driving method of the display panel according to claim 11, wherein duration of the first working electric field and duration of the first auxiliary electric field do not overlap.

14. The driving method of the display panel according to claim 11, wherein
the auxiliary electrode includes a first surface facing the pixel electrode; and
after the charged particles move from a position far away from the auxiliary electrode to a position where at least a portion of the charged particles are located between the first surface of the auxiliary electrode and the transparent electrode under the drive of a first working electric field, stop the providing of the first voltage difference between the transparent electrode and the pixel electrode, and perform the providing of the second voltage difference between the transparent electrode and the auxiliary electrode so that the charged particles enter the accommodation space in the electrostrictive dielectric layer.

15. The driving method of the display panel according to claim 11, further comprising:
when the charged particles are confined in the electrostrictive dielectric layer, providing a third voltage difference between the transparent electrode and the auxiliary electrode to form a second auxiliary electric field to drive the electrostrictive dielectric layer to stretch so that the charged particles are released from the accommodation space of the electrostrictive dielectric layer; and
providing a fourth voltage difference between the transparent electrode and the pixel electrode to form a second working electric field to drive the charged particles to move toward the pixel electrode.

16. The driving method of the display panel according to claim 15, wherein directions of the second working electric field and the second auxiliary electric field are substantially the same.

17. The driving method of the display panel according to claim 15, wherein duration of the second working electric field and duration of the second auxiliary electric field do not overlap.

18. The driving method of the display panel according to claim 15, wherein
the auxiliary electrode includes a second surface facing the transparent electrode,
after the charged particles move from positions of the electrostrictive dielectric layer to positions where at least a portion of the charged particles are located between the second surface of the auxiliary electrode and the pixel electrode under the drive of a second auxiliary electric field, stop the providing of the third voltage difference between the transparent electrode and the auxiliary electrode, and perform the providing of the fourth voltage difference between the transparent electrode and the pixel electrode.

19. The display panel according to claim 6, wherein the minimum inner diameter of the through channel is 2 μm, and an outer diameter of the charged particles is in a range of 200 nm to 500 nm.

* * * * *